US011825175B2

(12) United States Patent
Dhruv et al.

(10) Patent No.: US 11,825,175 B2
(45) Date of Patent: Nov. 21, 2023

(54) SYSTEMS, METHODS, AND STORAGE MEDIA FOR UPDATING MEDIA STREAM METADATA IN A MANIFEST CORRESPONDING A MEDIA STREAM PACKAGE

(71) Applicant: CBS Interactive Inc., San Francisco, CA (US)

(72) Inventors: Jignesh Dhruv, Plainsboro, NJ (US); Vishal Shah, Tempe, AZ (US)

(73) Assignee: CBS Interactive Inc., San Francisco, CA (US)

( * ) Notice: Subject to any disclaimer, the term of this patent is extended or adjusted under 35 U.S.C. 154(b) by 0 days.

(21) Appl. No.: 17/199,486

(22) Filed: Mar. 12, 2021

(65) Prior Publication Data

US 2022/0272423 A1 Aug. 25, 2022

Related U.S. Application Data

(60) Provisional application No. 63/153,399, filed on Feb. 25, 2021.

(51) Int. Cl.

| | |
|---|---|
| ***H04N 21/84*** | (2011.01) |
| ***H04L 65/75*** | (2022.01) |
| ***H04N 21/81*** | (2011.01) |
| ***H04N 21/845*** | (2011.01) |

(52) U.S. Cl.

CPC ............. *H04N 21/84* (2013.01); *H04L 65/75* (2022.05); *H04N 21/8106* (2013.01); *H04N 21/8126* (2013.01); *H04N 21/8456* (2013.01)

(58) Field of Classification Search

CPC ............... H04N 21/84; H04N 21/8106; H04N 21/8126; H04N 21/8456; H04N 21/2335; H04N 21/23439; H04N 21/235; H04N 21/26603; H04N 21/8352; H04N 21/26258; H04L 65/601; H04L 65/75

See application file for complete search history.

(56) References Cited

U.S. PATENT DOCUMENTS

| | | | | |
|---|---|---|---|---|
| 9,513,762 | B1 * | 12/2016 | Hakim | G06F 8/65 |
| 11,134,287 | B1 * | 9/2021 | Wu | H04N 21/812 |
| 2011/0307781 | A1 * | 12/2011 | Sood | H04N 21/8456 709/231 |

(Continued)

*Primary Examiner* — Adil Ocak

(74) *Attorney, Agent, or Firm* — Rimon PC; Marc S. Kaufman

(57) ABSTRACT

Systems, methods, and storage media for updating a media stream manifest corresponding a media stream package are disclosed. Exemplary implementations may: receive an original manifest corresponding to a media stream and a revised manifest corresponding to an updated version of the media stream; determine an identifier of the track of the media stream based on a combination of metadata in the original manifest; determine an identifier of a corresponding track of the updated version of the media stream based on a combination of metadata in the revised manifest; determine new metadata in the revised manifest that is not included in the existing manifest; generate a delta manifest of the new metadata; and insert the new metadata into the corresponding portions of original manifest and storing the resulting data structure to a data store associated with stored media objects for the updated to thereby generate a final manifest.

9 Claims, 2 Drawing Sheets

(56) References Cited

U.S. PATENT DOCUMENTS

| | | | | |
|---|---|---|---|---|
| 2013/0282915 | A1* | 10/2013 | Patel | H04N 21/8456<br>709/231 |
| 2014/0150044 | A1* | 5/2014 | Takahashi | H04N 21/23116<br>725/116 |
| 2016/0224638 | A1* | 8/2016 | Bestler | G06F 11/1076 |
| 2019/0342356 | A1* | 11/2019 | Thomas | H04N 21/8458 |
| 2020/0396521 | A1* | 12/2020 | Weiner | H04L 65/4084 |
| 2021/0160551 | A1* | 5/2021 | Hou | H04N 21/6125 |

* cited by examiner

SYSTEMS, METHODS, AND STORAGE MEDIA FOR UPDATING MEDIA STREAM METADATA IN A MANIFEST CORRESPONDING A MEDIA STREAM PACKAGE

CROSS-REFERENCE TO RELATED APPLICATIONS

The present application claims benefit of U.S. Provisional App. Ser. No. 63/153,399 filed on Feb. 25, 2021, the contents of which are incorporated herein by reference in their entirety.

FIELD OF THE DISCLOSURE

The present disclosure relates to systems, methods, and storage media for updating media stream metadata in a manifest corresponding a media stream package.

BACKGROUND

Streaming media, video or audio content for example over networks such as the internet has become very common. Media content is packaged by a packager which prepares output streams for access by different types of players. The packager type specifies the streaming format that package delivers from the endpoint (for example DASH-ISO, Microsoft Smooth Streaming, CMAF, or Apple HLS). Additional packager settings include buffer and update durations and manifest tag handling instructions. When the streaming media is packaged, a "manifest file" (or simply "manifest") is created. The manifest can be delivered to the player and specifies the available streams. The manifest tells the player what resolutions and bitrates are available, and the player chooses an appropriate stream(s).

Often it is desirable to add or replace a track a packaged media stream. Fore example, a subtitle track might be added. In order to add/replace a track, the media must be repackaged. (Repackaging Media with replacement tracks like Audio or Subtitles is a resource heavy process using conventional procedures. Such repackaging requires transcoding content and generating a new manifest. These processes require removing and replacing large media files in many storage locations and thus is compute resources intensive.

It is known to do "on the fly" or "just in time" manifest replacement/regeneration of only the tracks that are new or need to be replaced. When a playback device requests content, a custom manifest can be created in a format that is compatible with the requesting device. However, conventional manifest replacement processes are still resource intensive and thus slow because all original source files are pulled down and re-encoded before packaging them in a manifest. For example, adding 1 new audio stream with conventional packaging would require downloading all existing audios to repackage them. Therefore, current methods do not permit the republication of content in a manner that is satisfactory for fast publication in state of the art content distribution systems.

SUMMARY

Disclosed implementations include a media packager that allows republication without the need to pull down any video related media data since there is no need to update the video tracks, thus reducing the need for compute/storage resources. The disclosed implementations have the ability to package captions, audio, and other elements without re-transcoding all video encodes, and removing replacing old assets. The methods and apparatus are scalable, save time and save compute/storage resources.

One aspect of the present disclosure relates to a system configured for updating media stream metadata in a manifest corresponding a media stream package. The system may include one or more hardware processors configured by machine-readable instructions. The processor(s) may be configured to receive an original manifest corresponding to a media stream and a revised manifest corresponding to an updated version of the media stream. The revised manifest may include metadata related to new content to be added to a track of the media stream to create the updated version of the media stream. The processor(s) may be configured to determine a unique identifier of the track of the media stream based on a combination of metadata in the original manifest. The processor(s) may be configured to determine a unique identifier of a corresponding track of the updated version of the media stream based on a combination of metadata in the revised manifest. The processor(s) may be configured to determine new metadata in the revised manifest that is not included in the existing manifest based on the unique identifiers. The processor(s) may be configured to generate a delta manifest of the new metadata. The processor(s) may be configured to insert the new metadata into the corresponding portions of original manifest and storing the resulting data structure to a data store associated with stored media objects for the updated to thereby generate a final manifest.

Another aspect of the present disclosure relates to a method for updating media stream metadata in a manifest corresponding a media stream package. The method may include receiving an original manifest corresponding to a media stream and a revised manifest corresponding to an updated version of the media stream. The revised manifest may include metadata related to new content to be added to a track of the media stream to create the updated version of the media stream. The method may include determining a unique identifier of the track of the media stream based on a combination of metadata in the original manifest. The method may include determining a unique identifier of a corresponding track of the updated version of the media stream based on a combination of metadata in the revised manifest. The method may include determining new metadata in the revised manifest that is not included in the existing manifest based on the unique identifiers. The method may include generating a delta manifest of the new metadata. The method may include inserting the new metadata into the corresponding portions of original manifest and storing the resulting data structure to a data store associated with stored media objects for the updated to thereby generate a final manifest.

Yet another aspect of the present disclosure relates to a non-transient computer-readable storage medium having instructions embodied thereon, the instructions being executable by one or more processors to perform a method for updating media stream metadata in a manifest corresponding a media stream package. The method may include receiving an original manifest corresponding to a media stream and a revised manifest corresponding to an updated version of the media stream. The revised manifest may include metadata related to new content to be added to a track of the media stream to create the updated version of the media stream. The method may include determining a unique identifier of the track of the media stream based on a combination of metadata in the original manifest. The method may include determining a unique identifier of a corresponding track of the updated version of the media stream based on a combination of metadata in the revised manifest. The method may include determining new metadata in the revised manifest that is not included in the existing manifest based on the unique identifiers. The method may include generating a delta manifest of the new metadata. The method may include inserting the new metadata into the corresponding portions of original manifest and storing the resulting data structure to a data store associated with stored media objects for the updated to thereby generate a final manifest.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of “a”, “an”, and “the” include plural referents unless the context clearly dictates otherwise.

DETAILED DESCRIPTION

Figure 1:
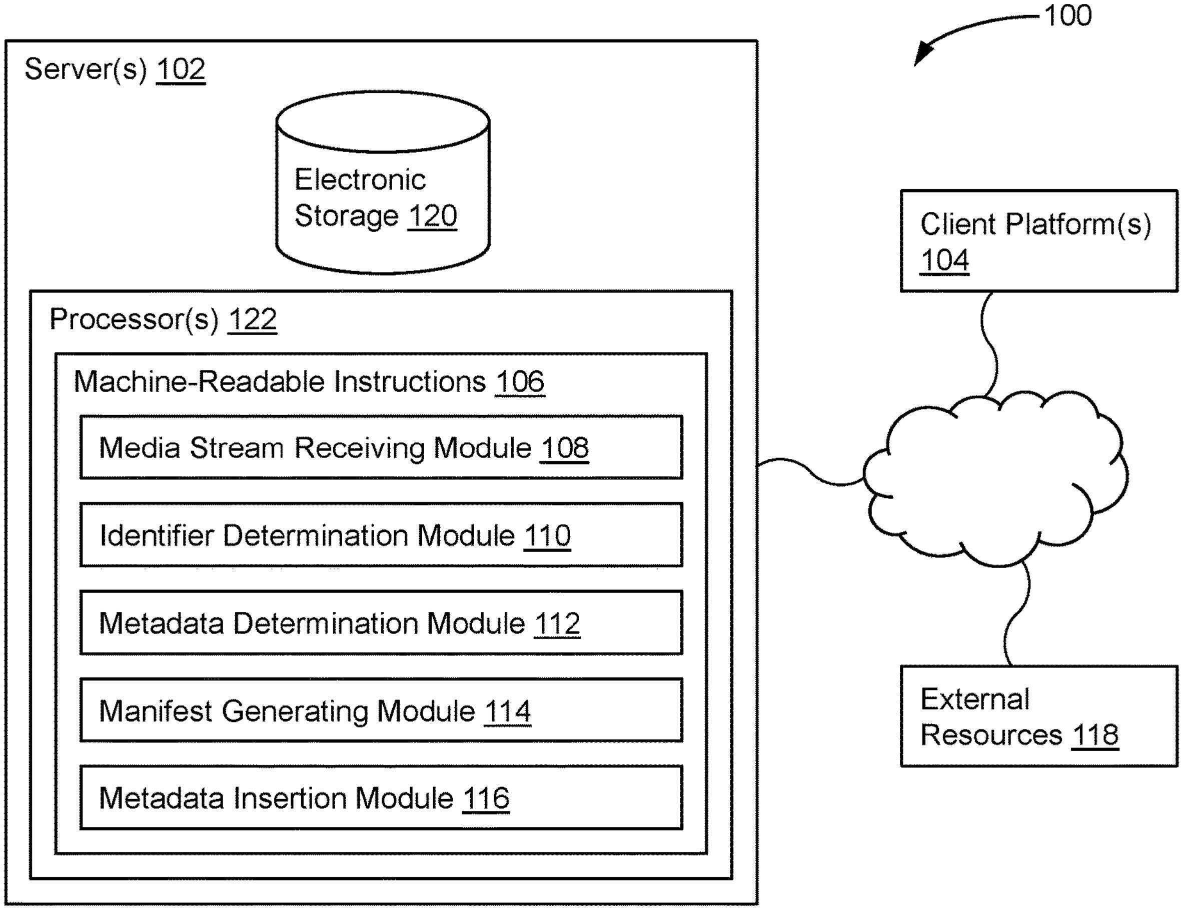
FIG. 1 illustrates a system configured for updating media stream metadata in a manifest corresponding a media stream package, in accordance with one or more implementations.

As noted above, a manifest specifies metadata for a media stream. The metadata can include, media types for each track, location of the corresponding data files, available resolutions, available bitrates, and other metadata that allow a player to select the correct tracks and play the media content. An example of a manifest in the DASH format, which uses XMK for the manifest, is set forth below.

```
<?xml version="1.0" encoding="UTF-8"?>
<!--Generated with https://github.com/google/shaka-packager version 2c51dcc-release-->
<MPD xmlns="urn:mpeg:dash:schema:mpd:2011"
xmlns:xsi="http://www.w3.org/2001/XMLSchema-instance"
xmlns:cenc="urn:mpeg:cenc:2013"
xsi:schemaLocation="urn:mpeg:dash:schema:mpd:2011 DASH-MPD.xsd"
profiles="urn:mpeg:dash:profile:isoff-live:2011" minBufferTime="PT2S" type="static"
mediaPresentationDuration="PT2509.632080078125S">
  <Period id="0">
    <AdaptationSet id="0" contentType="text" lang="es-MX" segmentAlignment="true">
      <Role schemeIdUri="urn:mpeg:dash:role:2011" value="subtitle"/>
      <Representation id="0" bandwidth="887" codecs="wvtt"
mimeType="application/mp4">
        <SegmentTemplate timescale="1000"
initialization="439013_2398_es_sub_retimed_vendor/vtt_init.m4v"
media="439013_2398_es_sub_retimed_vendor/seg_$Number$.m4s" startNumber="1">
          <SegmentTimeline>
            <S t="0" d="6000" r="424"/>
          </SegmentTimeline>
        </SegmentTemplate>
      </Representation>
    </AdaptationSet>
  <AdaptationSet id="1" contentType="text" lang="en" segmentAlignment="true">
    <Role schemeIdUri="urn:mpeg:dash:role:2011" value="subtitle"/>
    <Representation id="1" bandwidth="1240" codecs="wvtt"
mimeType="application/mp4">
      <SegmentTemplate timescale="1000"
initialization="CBS_NCIS_366_2398_1547517940056_v2.1/vtt_init.m4v"
media="CBS_NCIS_366_2398_1547517940056_v2.1/seg_$Number$.m4s"
startNumber="1" >
        <SegmentTimeline>
          <S t="0" d="6000" r="412"/>
        </SegmentTimeline>
      </SegmentTemplate>
    </Representation>
  </AdaptationSet>
  <AdaptationSet id="2" contentType="text" lang="pt-BR" segmentAlignment="true">
    <Role schemeIdUri="urn:mpeg:dash:role:2011" value="subtitle"/>
    <Representation id="2" bandwidth="871" codecs="wvtt"
mimeType="application/mp4">
    <SegmentTemplate timescale="1000" initialization="439013_2398_pt-
BR_sub_retimed_vendor/vtt_init.m4v" media="439013_2398_pt-
BR_sub_retimed_vendor/seg_$Number$.m4s" startNumber="1">
      <SegmentTimeline>
        <S t="0" d="6000" r="424"/>
      </SegmentTimeline>
    </SegmentTemplate>
    </Representation>
  </AdaptationSet>
  .....................
<AdaptationSet id="7" contentType="audio" lang="en" segmentAlignment="true">
```

-continued

```
  <ContentProtection value="cenc"
schemeIdUri="urn:mpeg:dash:mp4protection:2011" cenc:default_KID="b0941713-0ca5-
44e0-ae8a-e1847b35e614"/>
  <ContentProtection schemeIdUri="urn:uuid:edef8ba9-79d6-4ace-a3c8-
27dcd51d21ed">
    <cenc:pssh>AAAAVnB.....V3BaNWRqYzc=</cenc:pssh>
  </ContentProtection>
  <ContentProtection schemeIdUri="urn:uuid:9a04f079-9840-4286-ab92-
e65be0885f95">
<cenc:pssh>AAADqHBzc2gAAAAAmgTweZhA.........AFUATQA+ADwALwBEAEE
AVABBAD4APAAvAFcAUgBNAEgARQBBAEQARQBSAD4A</cenc:pssh>
  </ContentProtection>
  <Representation id="11" bandwidth="131068" codecs="mp4a.40.2"
mimeType="audio/mp4" audioSamplingRate="48000">
  <AudioChannelConfiguration
schemeIdUri="urn:mpeg:dash:23003:3:audio_channel configuration:2011" value="2"/>
  <SegmentTemplate timescale="48000"
initialization="CBS_NCIS_366_AA_6CH_30M_1732145_3_aac_128/init.m4v"
media="CBS_NCIS_366_AA_6CH_30M_1732145_3_aac_128/seg_$Number$.m4s"
startNumber="1">
  <SegmentTimeline>
        <S t="0" d=288768"/>
        <S t="288768" d="287744" r="2"/>
        <S t="1152000" d="288768"/>
        <S t="1440768" d="287744" r="2"/>
        <S t="2304000" d="288768"/>
        <S t="2592768" d="287744" r="2"/>
        <S t="3456000" d="288768"/>
        <S t="3744768" d="287744" r="2"/>
        <S t="4608000" d="288768"/>
        <S t="4896768" d="287744" r="2"/>
        .....
        <S t="117792768" d="287744" r="2"/>
        <S t="118656000" d="288768"/>
        <S t="118944768" d="287744" r="2"/>
        <S t="119808000" d="288768"/>
        <S t="120096768" d="287744"/>
        <S t="120384512" d="79872"/>
      </SegmentTimeline>
    </SegmentTemplate>
  </Representation>
</AdaptationSet>
<AdaptationSet id="8" mimeType="image/jpeg" contentType="image">
  <SegmentTemplate media="$RepresentationID$/tile_$Number$.jpg" duration="8"
startNumber="1"/>
  <Representation bandwidth="17368" id="thumb_640x360" width="1280"
height="1440">
  <EssentialProperty schemeIdUri="http://dashif.org/thumbnail_tile" value="2x4"/>
</Representation>
<Representation bandwidth="24431" id="thumb_768x432" width="1536"
height="1728">
        <EssentialProperty schemeIdUri="http://dashif.org/thumbnail_tile" value="2x4"/>
      </Representation>
    </AdaptationSet>
  </Period>
</MPD>
```

Disclosed embodiments are able to identify and replace portions of the manifest to implement new tracks and/or change tracks without the need to repackage the media stream. FIG. 1 illustrates a system 100 configured for updating media stream metadata in a manifest corresponding a media stream package, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction modules. The instruction modules may include computer program modules. The instruction modules may include one or more of media stream receiving module 108, identifier determination module 110, metadata determination module 112, manifest generating module 114, metadata insertion module 116, and/or other instruction modules. The modules are described at a high level immediately below. The functionality of the modules are illustrated in further detail through specific examples set forth after the high level description.

Media stream receiving module 108 may be configured to receive an original manifest corresponding to a media stream and a revised manifest corresponding to an updated version of the media stream. The revised manifest may include metadata related to new content to be added to a track of the media stream to create the updated version of the media stream. By way of non-limiting example, the track of the media stream may be one of an audio track, a subtitle track, or a video track.

Identifier determination module 110 may be configured to determine a unique identifier of the track of the media stream based on a combination of metadata in the original manifest. For example, with reference to the snippet of an HLS manifest below, the two lines specify an audio track variant.

```
#EXT-X-MEDIA:TYPE=AUDIO,
URI="CBS_NCIS_366_AA_6CH_30M_1732145_3_aac_128/stream.m3u8",GROUP-
ID="audio_aac",LANGUAGE="en",NAME="ENGLISH",DEFAULT=YES,
AUTOSELECT=YES,CHANNELS="2"
#EXT-X-
```

This ID for this variant can be expressed as "audio_aac, en, ENGLISH" which is a concatenation of some of the values of the properties. Identifier determination module 110 may be configured to determine a unique identifier of a corresponding track of the updated version of the media stream based on a combination of metadata in the revised manifest. For a given audio variant in HLS stream a set of properties is selected to generate a unique identifier for that variant. In this example, the unique identifier is combination of ID+LANGUAGE+NAME. If there was another aac audio variant just ID cannot be used as the unique identifier, so a check is conducted for more properties like LANGUAGE and NAME to generate a unique key that represents this stream. For example a video that has 2 aac audio variants one 'en—ENGLISH' and one 'fr—FRENCH' they both with have ID as 'audio_aac', so we user Language 'en' and 'fr' to further distinguish between those two variants.

Metadata determination module 112 may be configured to determine new metadata in the revised manifest that is not included in the existing manifest based on the unique identifiers.

Manifest generating module 114 may be configured to generate a delta manifest of the new metadata.

Metadata insertion module 116 may be configured to insert the new metadata into the corresponding portions of original manifest and storing the resulting data structure to a data store associated with stored media objects for the updated to thereby generate a final manifest.

In some implementations, the unique identifiers may be generated based properties of a corresponding track. In some implementations, the unique identifiers may be generated in a manner that corresponds to the predetermined specification.

Figure 2:
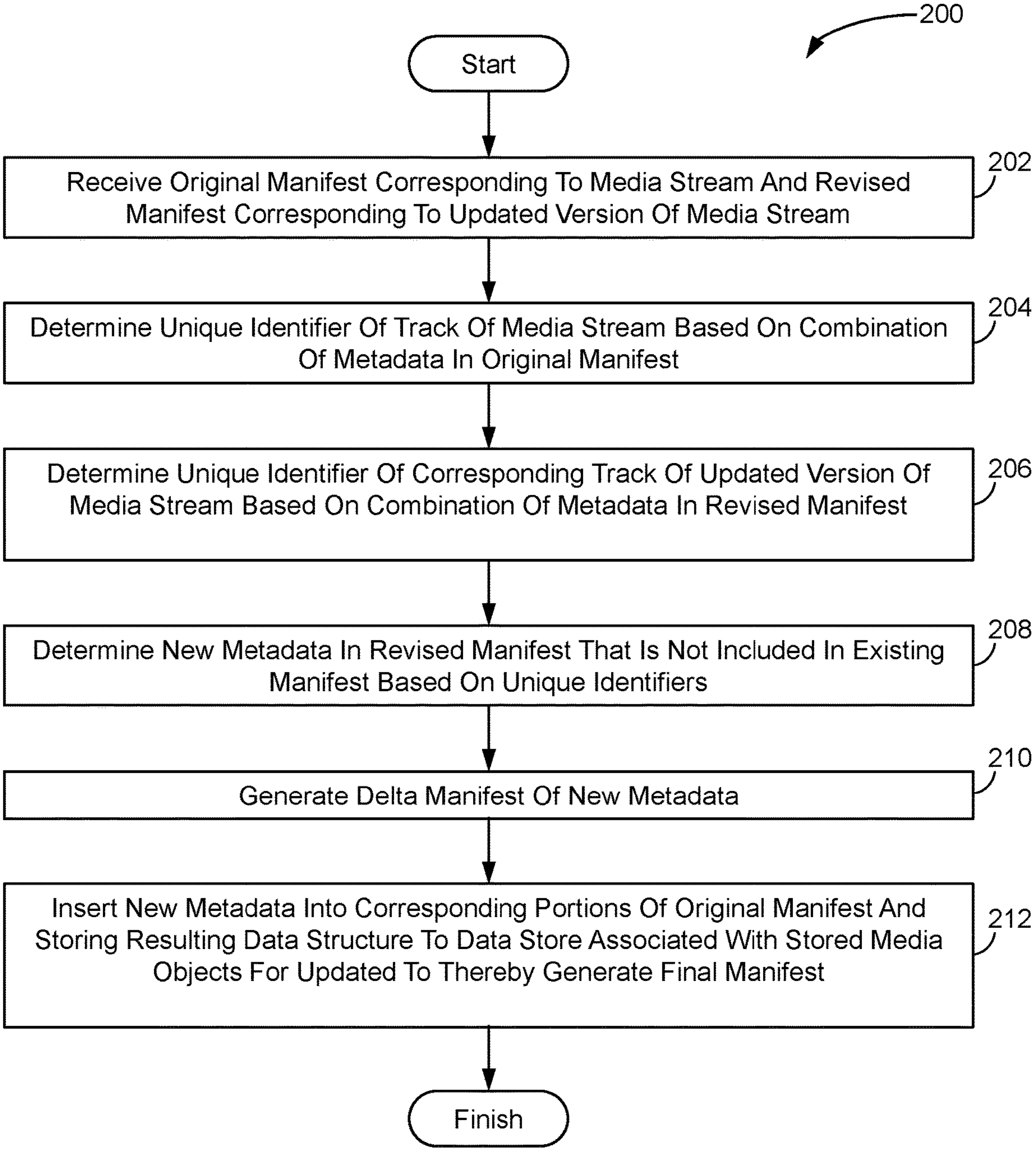
FIG. 2 illustrates a method for updating media stream metadata in a manifest corresponding a media stream package, in accordance with one or more implementations.

FIG. 2 illustrates a method 200 for updating media stream metadata in a manifest corresponding a media stream package, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include receiving an original manifest corresponding to a media stream and a revised manifest corresponding to an updated version of the media stream. The revised manifest may include metadata related to new content to be added to a track of the media stream to create the updated version of the media stream. Operation 202 may be performed by one or more hardware processors configured by machine-readable instructions including a module that is the same as or similar to media stream receiving module 108, in accordance with one or more implementations.

An operation 204 may include determining a unique identifier of the track of the media stream based on a combination of metadata in the original manifest. Operation 204 may be performed by one or more hardware processors configured by machine-readable instructions including a module that is the same as or similar to identifier determination module 110, in accordance with one or more implementations.

An operation 206 may include determining a unique identifier of a corresponding track of the updated version of the media stream based on a combination of metadata in the revised manifest. Operation 206 may be performed by one or more hardware processors configured by machine-readable instructions including a module that is the same as or similar to identifier determination module 110, in accordance with one or more implementations.

An operation 208 may include determining new metadata in the revised manifest that is not included in the existing manifest based on the unique identifiers. Operation 208 may be performed by one or more hardware processors configured by machine-readable instructions including a module that is the same as or similar to metadata determination module 112, in accordance with one or more implementations.

An operation 210 may include generating a delta manifest of the new metadata. Operation 210 may be performed by one or more hardware processors configured by machine-readable instructions including a module that is the same as or similar to manifest generating module 114, in accordance with one or more implementations.

An operation 212 may include inserting the new metadata into the corresponding portions of original manifest and storing the resulting data structure to a data store associated with stored media objects for the updated to thereby generate a final manifest. Operation 212 may be performed by one or more hardware processors configured by machine-readable instructions including a module that is the same as or similar to metadata insertion module 116, in accordance with one or more implementations.

Specific examples of the disclosed implementations are described below with respect to HLS and DASH manifest s y taking two manifests as input and running a delta comparison on both manifests. First, an original manifest and a revised manifest (which includes, tracks to be added to the streaming media package) are received, i.e. made available to a parsing tool. In this example, the revised manifest includes audio and subtitle tracks to be added to the media package. The two manifests are then parsed, by a parsing tool (using parsing rues for the appropriate format) to find the audio and subtitle variants that are missing from the original manifest using a combination of metadata which translate into a unique identifier for each stream. The identifiers are created by combining values of properties of the track metadata.

In this example, for audio and subtitle streams the parsing tool checks for properties like Language, Group, Name and Codecs for each stream descriptor which helps it identify and calculate the manifest delta. Descriptors define the stream to ascertain if there are new or updated tracks. The results of parsing the manifest is to generate a unique id for each track by combining some or all properties for each track. The parsing and creation of unique identifiers can be accomplished by module identifier determination module 110 of FIG. 1. A new delta manifest I generated using the information in the unique identifiers information and doing an in-place replacement and rewriting of stream data to create the final manifest which can be uploaded to a data store where the files for that media object exist, so that the final manifest can be served out to the streaming devices.

In this example, the original manifest can be the DASH manifest shown above. Assuming that a new track is to be added to the media package, the manifest including the new track can be specified by the following manifest.

```
<?xml version="1.0" encoding="UTF-8"?>
<!--Generated with https://github.com/google/shaka-packager version 2c51dcc-release-->
<MPD xmlns="urn:mpeg:dash:schema:mpd:2011"
xmlns:xsi="http://www.w3.org/2001/XMLSchema-instance"
xmlns:cenc="urn:mpeg:cenc:2013"
xsi:schemaLocation="urn:mpeg:dash:schema:mpd:2011 DASH-MPD.xsd"
profiles="urn:mpeg:dash:profile:isoff-live:2011" minBufferTime="PT2S" type="static"
mediaPresentationDuration="PT2509.632080078125S">
  <Period id="0">
    <AdaptationSet id="0" contentType="text" lang="fr" segmentAlignment="true">
      <Role schemeIdUri="urn:mpeg:dash:role:2011" value="subtitle"/>
      <Representation id="0" bandwidth="1240" codecs="wvtt"
mimeType="application/mp4">
        <SegmentTemplate timescale="1000"
initialization="CBS_NCIS_366_2398_1547517940056_v2.1.fr/vtt_init.m4v"
media="CBS_NCIS_366_2398_1547517940056_v2.1.fr/seg_$Number$.m4s"
startNumber="1">
          <SegmentTimeline>
            <S t="0" d="6000" r="412"/>
          </SegmentTimeline>
        </SegmentTemplate>
      </Representation>
    </AdaptationSet>
    <AdaptationSet id="1" contentType="audio" lang="fr" segmentAlignment="true">
    <ContentProtection value="cenc"
schemeIdUri="urn:mpeg:dash:mp4protection:2011" cenc:default_KID="b0941713-0ca5-
44e0-ae8a-e1847b35e614"/>
      <ContentProtection schemeIdUri="urn:uuid:edef8ba9-79d6-4ace-a3c8-
27dcd51d21ed">
        <cenc:pssh>AAAAVn.....aNWRqYzc=</cenc:pssh>
      </ContentProtection>
      <ContentProtection schemeIdUri="urn:uuid:9a04f079-9840-4286-ab92-
e65be0885f95">
<cenc:pssh>AAADqHBzc.....ADwALwBEAEEAVABBAD4APAAvAFcAUgBNAEgA
RQBBAEQARQBSAD4A</cenc:pssh>
      </ContentProtection>
      <Representation id="11" bandwidth="131068" codecs="mp4a.40.2"
mimeType="audio/mp4" audioSamplingRate="48000">
      <AudioChannelConfiguration
schemeIdUri="urn:mpeg:dash:23003:3:audio_channel_configuration:2011" value="2"/>
      <SegmentTemplate timescale="48000"
initialization="CBS_NCIS_366_AA_6CH_30M_1732145_3_aac_128_fr/init.m4v"
media="CBS_NCIS_366_AA_6CH_30M_1732145_3_aac_128_fr/seg_$Number$.m4s"
startNumber="1">
          <SegmentTimeline>
            <S t="0" d="288768"/>
            <S t="288768" d="287744" r="2"/>
            <S t="1152000" d="288768"/>
            <S t="1440768" d="287744" r="2"/>
            <S t="2304000" d="288768"/>
              ........
            <S t="117504000" d="288768"/>
            <S t="117792768" d="287744" r="2"/>
            <S t="118656000" d="288768"/>
            <S t="118944768" d="287744" r="2"/>
            <S t="119808000" d="288768"/>
            <S t="120096768" d="287744"/>
            <S t="120384512" d="79872"/>
          </SegmentTimeline>
        </SegmentTemplate>
      </Representation>
```

-continued

```
    </AdaptationSet>
  </Period>
</MPD>
```

The result of the parsing and comparison noted above is the final manifest shown below which includes metadata from the delta manifest inserted therein. Sections of the manifest that specify the new tracks are italicized below.

```
<?xml version="1.0" encoding="UTF-8"?>
<MPD xmlns="urn:mpeg:dash:schema:mpd:2011"
xmlns:xsi="http://www.w3.org/2001/XMLSchema-instance"
xmlns:cenc="urn:mpeg:cenc:2013" xmlns:mspr="urn:microsoft:playready"
xsi:schemaLocation="urn:mpeg:dash:schema:mpd:2011 DASH-MPD.xsd"
profiles="urn:mpeg:dash:profile:isoff-live:2011" type="static"
mediaPresentationDuration="PT2509.632080078125S" minBufferTime="PT2S">
    <Period id="0">
      <AdaptationSet id="0" segmentAlignment="true" lang="en" contentType="text">
        <Role schemeIdUri="urn:mpeg:dash:role:2011" value="subtitle"></Role>
        <Representation mimeType="application/mp4" bandwidth="1240" codecs="wvtt"
id="0">
        <SegmentTemplate
initialization="CBS_NCIS_366_2398_1547517940056_v2.l/vtt_init.m4v"
media="CBS_NCIS_366_2398_1547517940056_v2.1/seg_$Number$.m4s"
startNumber="1" timescale="1000">
        <SegmentTimeline>
          <S t="0" d="6000" r="412"></S>
        </SegmentTimeline>
      </SegmentTemplate>
    </Representation>
  </AdaptationSet>
  <AdaptationSet id="1" segmentAlignment="true" lang="es-MX" contentType="text">
    <Role schemeIdUri="urn:mpeg:dash:role:2011" value="subtitle"></Role>
    <Representation mimeType="application/mp4" bandwidth="887" codecs="wvtt"
id="1">
      <SegmentTemplate
initialization="439013_2398_es_sub_retimed_vendor/vtt_init.m4v"
media="439013_2398_es_sub_retimed_vendor/seg_$Number$.m4s" startNumber="1"
timescale="1000">
      <SegmentTimeline>
        <S t="0" d="6000" r="424"></S>
      </SegmentTimeline>
    </SegmentTemplate>
  </Representation>
</AdaptationSet>
  <AdaptationSet id="2" segmentAlignment="true" lang="fr" contentType="text">
    <Role schemeIdUri="urn:mpeg:dash:role:2011" value="subtitle"></Role>
    <Representation mimeType="application/mp4" bandwidth="1240" codecs="wvtt"
id="2">
    <SegmentTemplate
initialization="CBS_NCIS_366_2398_1547517940056_v2.1.fr/vtt_init.m4v"
media="CBS_NCIS_366_2398_1547517940056_v2.1.fr/seg_$Number$.m4s"
startNumber="1" timescale= "1000">
    <SegmentTimeline>
        <S t="0" d="6000" r="412"></S>
      </SegmentTimeline>
    </SegmentTemplate>
  </Representation>
</AdaptationSet>
<AdaptationSet id="3" segmentAlignment="true" lang="pt-BR" contentType="text">
  <Role schemeIdUri="urn:mpeg:dash:role:2011" value="subtitle"></Role>
  <Representation mimeType="application/mp4" bandwidth="871" codecs="wvtt"
id="3">
  <SegmentTemplate initialization="439013_2398_pt-
BR_sub_retimed_vendor/vtt_init.m4v" media="439013_2398_pt-
BR_sub_retimed_vendor/seg_$Number$.m4s" startNumber="1" timescale="1000">
      <SegmentTimeline>
        <S t="0" d="6000" r="424"></S>
      </SegmentTimeline>
    </SegmentTemplate>
  </Representation>
</AdaptationSet>
......
<AdaptationSet id="8" segmentAlignment="true" lang="en" contentType="audio">
    <ContentProtection schemeIdUri="urn:mpeg:dash:mp4protection:2011"
cenc:default_KID="b0941713-0ca5-44e0-ae8a-e1847b35e614"
value="cenc"></ContentProtection>
    <ContentProtection schemeIdUri="urn:uuid:edef8ba9-79d6-4ace-a3c8-
```

-continued

```
27dcd51d21ed">
      <cenc:pssh>AAAAVn....aNWRqYzc=</cenc:pssh>
   </ContentProtection>
   <ContentProtection schemeIdUri="urn:uuid:9a04f079-9840-4286-ab92-
e65be0885f95">
      <cenc:pssh>AAADqH....gBNAEgARQBBAEQARQBSAD4A</cenc:pssh>
   </ContentProtection>
   <Representation mimeType="audio/mp4" audioSamplingRate="48000"
bandwidth="131068" codecs="mp4a.40.2" id="13">
   <AudioChannelConfiguration
schemeIdUri="urn:mpeg:dash:23003:3:audio_channel_configuration:2011"
value="2"></AudioChannelConfiguration>
   <SegmentTemplate
initialization="CBS_NCIS_366_AA_6CH_30M_1732145_3_aac_128/init.m4v"
media="CBS_NCIS_366_AA_6CH_30M_1732145_3_aac_128/seg_$Number$.m4s"
startNumber="1" timescale="48000">
   <SegmentTimeline>
         <S t="0" d="288768"></S>
         <S t="288768" d="287744" r="2"></S>
         <S t="1152000" d="288768"></S>
            ....
         <S t="117504000" d="288768"></S>
         <S t="117792768" d="287744" r="2"></S>
         <S t="118656000" d="288768"></S>
         <S t="118944768" d="287744" r="2"></S>
         <S t="119808000" d="288768"></S>
         <S t="120096768" d="287744"></S>
         <S t="120384512" d="79872"></S>
        </SegmentTimeline>
      </SegmentTemplate>
   </Representation>
</AdaptationSet>
<AdaptationSet id="9" segmentAlignment="true" lang="fr" contentType="audio">
   <ContentProtection schemeIdUri="urn:mpeg:dash:mp4protection:2011"
cenc:default_KID="b0941713-0ca5-44e0-ae8a-e1847b35e614"
value="cenc"></ContentProtection>
   <ContentProtection schemeIdUri="urn:uuid:edef8ba9-79d6-4ace-a3c8-
27dcd51d21ed">
      <cenc:pssh>AAAAVn...aNWRqYzc=</cenc:pssh>
   </ContentProtection>
   <ContentProtection schemeIdUri="urn:uuid:9a04f079-9840-4286-ab92-
e65be0885f95">
      <cenc:pssh>AAADqH ....QBBAEQARQBSAD4A</cenc:pssh>
   </ContentProtection>
   <Representation mimeType="audio/mp4" audioSamplingRate="48000"
bandwidth="131068" codecs="mp4a.40.2" id="14">
      <AudioChannelConfiguration
schemeIdUri="urn:mpeg:dash:23003:3:audio_channel_configuration:2011"
value="2"></AudioChannelConfiguration>
      <SegmentTemplate
initialization="CBS_NCIS_366_AA_6CH_30M_1732145_3_aac_128_fr/init.m4v"
media="CBS_NCIS_366_AA_6CH_30M_1732145_3_aac_128_fr/seg_$Number$.m4s"
startNumber="1" timescale="48000">
      <SegmentTimeline>
         <S t="0" d="288768"></S>
         <S t="288768" d="287744" r="2"></S>
         <S t="1152000" d="288768"></S>
            ....
         <S t ="117504000" d="288768"></S>
         <S t="117792768" d="287744" r="2"></S>
         <S t="118656000" d="288768"></S>
         <S t="118944768" d="287744" r="2"></S>
         <S t="119808000" d="288768"></S>
         <S t="120096768" d="287744"></S>
         <S t="120384512" d="79872"></S>
        </SegmentTimeline>
      </SegmentTemplate>
   </Representation>
</AdaptationSet>
<AdaptationSet mimeType="image/jpeg" id="10" contentType="image">
   <SegmentTemplate duration="8" media="$RepresentationID$/tile_$Number$.jpg"
startNumber="1"></SegmentTemplate>
   <Representation bandwidth="17368" height="1440" id="thumb_640x360"
width="1280">
   <EssentialProperty schemeIdUri="http://dashif.org/thumbnail_tile"
value="2x4"></EssentialProperty>
   </Representation>
   <Representation bandwidth="24431" height="1728" id="thumb_768x432"
width="1536">
```

-continued

```
  <EssentialProperty schemeIdUri="http://dashif.org/thumbnail_tile"
value="2x4"></EssentialProperty>
        </Representation>
      </AdaptationSet>
  </Period>
</MPD>
```

In this example, the manifest AdaptationSet IDs can be rewritten so each AdaptationSet ID is still unique as expected by Dash Spec.

Another example, using the HLS stream format is set forth below. The original Manifest in this example is set forth below.

```
#EXTM3U
## Generated with https://github.com/google/shaka-packager version 2c51dcc-release
#EXT-X-
MEDIA:TYPE=AUDIO,URI="CBS_NCIS_366_AA_6CH_30M_1732145_3_aac_128/
stream.m3u8",GROUP-
ID="audio_aac",LANGUAGE="en",NAME="ENGLISH",DEFAULT=YES,
AUTOSELECT=YES,CHANNELS="2"
#EXT-X-
MEDIA:TYPE=AUDIO,URI="CBS_NCIS_366_AA_6CH_30M_1732145_4_dvs_128/
stream.m3u8",GROUP-ID="audio_aac",LANGUAGE="en" ,NAME="ENGLISH
AD",CHARACTERISTICS="public.accessibility.describes-video",CHANNELS="2"
#EXT-X-
MEDIA:TYPE=AUDIO,URI="CBS_NCIS_366_AA_6CH_30M_1732145_2_ac3_384/
stream.m3u8",GROUP-
ID="audio_ac3",LANGUAGE="en",NAME="ENGLISH",DEFAULT=YES,
AUTOSELECT=YES,CHANNELS="6"
#EXT-X-
MEDIA:TYPE=AUDIO,URI="CBS_NCIS_366_AA_6CH_30M_1732145_1_eac3_192/
stream.m3u8",GROUP-
ID="audio_ec3",LANGUAGE="en",NAME="ENGLISH",DEFAULT=YES,
AUTOSELECT=YES,CHANNELS="6"
#EXT-X-
MEDIA:TYPE=SUBTITLES,URI="439013_2398_es_sub_retimed_vendor/stream_vtt.
m3u8",GROUP-ID="cbsi_webvtt",LANGUAGE="es-
MX",NAME="SPANISH",AUTOSELECT=YES
#EXT-X-MEDIA:TYPE=SUBTITLES,URI="439013_2398_pt-
BR_sub_retimed_vendor/stream_vtt.m3u8",GROUP-
ID="cbsi_webvtt",LANGUAGE="pt-
BR",NAME="BRAZILIAN_PORTUGUESE",AUTOSELECT=YES
#EXT-X-
MEDIA:TYPE=SUBTITLES,URI="CBS_NCIS_366_2398_1547517940056_v2.1/stream_
vtt.m3u8",GROUP-
ID="cbsi_webvtt",LANGUAGE="en",NAME="ENGLISH",DEFAULT=YES,
AUTOSELECT=YES
#EXT-X-STREAM-INF:BANDWIDTH=2147155,AVERAGE-
BANDWIDTH=1724636,CODECS="avc1.640028,mp4a.40.2",RESOLUTION=960x540,
AUDIO="audio_aac",SUBTITLES="cbsi_webvtt"
CBS_NCIS_366_AA_6CH_30M_1732145_1500/stream.m3u8
#EXT-X-STREAM-INF:BANDWIDTH=4069099,AVERAGE-
BANDWIDTH=3248348,CODECS="avc1.640028,mp4a.40.2",RESOLUTION=1280x720,
AUDIO="audio_aac",SUBTITLES="cbsi_webvtt"
CBS_NCIS_366_AA_6CH_30M_1732145_3000/stream.m3u8
................................
#EXT-X-I-FRAME-STREAM-INF:BANDWIDTH=501083,AVERAGE-
BANDWIDTH=225982,CODECS="avc1.640028",RESOLUTION=960x540,URI="CBS_
NCIS_366_AA_6CH_30M_1732145_1500/stream_iframe.m3u8"
#EXT-X-I-FRAME-STREAM-INF:BANDWIDTH=999913,AVERAGE-
BANDWIDTH=386242,CODECS="avc1.640028",RESOLUTION.....
#EXT-X-I-FRAME-STREAM-INF:BANDWIDTH=289231,AVERAGE-
BANDWIDTH=130605,CODECS="avc1.640028",RESOLUTION=768x432,URI="CBS_
NCIS_366_AA_6CH_30M_1732145_750/stream_iframe.m3u8"
```

In the example, we are adding audio and subtitle tracks and the manifest for the added tracks is below.

```
EXTM3U
## Generated with https://github.com/google/shaka-packager version 2c51dcc-release
#EXT-X-
MEDIA:TYPE=AUDIO,URI="CBS_HAWAII_FIVE_0_201_HD_30M_6CH_1723667_
1_eac3_192/stream.m3u8",GROUP-
ID="audio_ec3",LANGUAGE="fr",NAME=" FRENCH",AUTOSELECT=YES,DEFAULT=
YES,CHANNELS="6"
#EXT-X-
MEDIA:TYPE=AUDIO,URI="CBS_HAWAII_FIVE_0_201_HD_30M_6CH_1723667_
2_ac3_384/stream.m3u8",GROUP-
ID="audio_ac3",LANGUAGE="fr",NAME="FRENCH",AUTOSELECT=YES,DEFAULT=
YES,CHANNELS="6"
#EXT-X-
MEDIA:TYPE=AUDIO,URI="CBS_HAWAII_FIVE_0_201_HD_30M_6CH_1723667_
3_aac_128/stream.m3u8",GROUP-
ID="audio_aac",LANGUAGE="fr",NAME="FRENCH",AUTOSELECT=YES,DEFAULT=
YES,CHANNELS="2"
#EXT-X-
MEDIA:TYPE=SUBTITLES,URI="1Dy0RTb4Jby61vKdI_BLUb1XbK1qMtnG_156814
8243528/stream_vtt.m3u8",GROUP-
ID="cbsi_webvtt",LANGUAGE="fr",NAME="FRENCH",AUTOSELECT=YES
```

The final manifest is shown below. The new metadata added to create the final manifest is italicized.

```
#EXTM3U
#EXT-X-MEDIA:TYPE=AUDIO,GROUP-
ID="audio_aac",NAME="ENGLISH",DEFAULT=YES,AUTOSELECT=YES,LANGUAGE=
"en",URI="CBS_NCIS_366_AA_6CH_30M_1732145_3_aac_128/stream.m3u8"
#EXT-X-MEDIA:TYPE=AUDIO,GROUP-ID="audio_aac",NAME="ENGLISH
AD",DEFAULT=NO,LANGUAGE="en",CHARACTERISTICS="public.accessibility.
describes-
video",URI="CBS_NCIS_366_AA_6CH_30M_1732145_4_dvs_128/stream.m3u8"
#EXT-X-MEDIA:TYPE=AUDIO,GROUP-
ID="audio_ac3",NAME="ENGLISH",DEFAULT=YES,AUTOSELECT=YES,LANGUAGE=
"en",URI="CBS_NCIS_366_AA_6CH_30M_1732145_2_ac3_384/stream.m3u8"
#EXT-X-MEDIA:TYPE=AUDIO,GROUP-
ID="audio_ec3",NAME=" ENGLISH",DEFAULT=YES,AUTOSELECT=YES,LANGUAGE=
"en",URI="CBS_NCIS_366_AA_6CH_30M_1732145_1_eac3_192/stream.m3u8"
#EXT-X-MEDIA:TYPE=AUDIO,GROUP-
ID="audio_aac",NAME="FRENCH",DEFAULT=YES,AUTOSELECT=YES,LANGUAGE=
"fr",URI="CBS_HAWAII_FIVE_0_201_HD_30M_6CH_1723667_3_aac_128/stream.m3u8"
#EXT-X-MEDIA:TYPE=AUDIO,GROUP-
ID="audio_ac3",NAME="FRENCH",DEFAULT=YES,AUTOSELECT=YES,LANGUAGE=
"fr",URI="CBS_HAWAII_FIVE_0_201_HD_30M_6CH_1723667_2_ac3_384/stream.m3u8"
#EXT-X-MEDIA:TYPE=AUDIO,GROUP-
ID="audio_ec3",NAME="FRENCH",DEFAULT=YES,AUTOSELECT=YES,LANGUAGE=
"fr",URI="CBS_HAWAII_FIVE_0_201_HD_30M_6CH _1723667_1_eac3_192/stream.m3u8"
#EXT-X-MEDIA:TYPE=SUBTITLES,GROUP-
ID="cbsi_webvtt",NAME=" ENGLISH",DEFAULT=YES,AUTOSELECT=YES,LANGUAGE=
"en",URI="CBS_NCIS_366_2398_1547517940056_v2.1/stream_vtt.m3u8"
#EXT-X-MEDIA:TYPE= SUBTITLES,GROUP-
ID="cbsi_webvtt",NAME="SPANISH",DEFAULT=NO,AUTOSELECT=YES,LANGUAGE=
"es-MX",URI="439013_2398_es_sub_retimed_vendor/stream_vtt.m3u8"
#EXT-X-MEDIA:TYPE= SUBTITLES,GROUP-
ID="cbsi_webvtt",NAME="FRENCH",DEFAULT=NO,AUTOSELECT=YES,LANGUAGE=
"fr",URI="1Dy0RTb4Jby61vKdI_BLUblXbK1qMtnG_1568148243528/stream_vtt.m3u8"
#EXT-X-MEDIA:TYPE= SUBTITLES,GROUP-
ID="cbsi_webvtt",NAME="BRAZILIAN_PORTUGUESE",DEFAULT=NO, AUTOSELECT=
YES,LANGUAGE="pt-BR",URI="439013_2398_pt-
BR_sub_retimed_vendor/stream_vtt.m3u8"
#EXT-X-STREAM-INF:PROGRAM-ID=0,BANDWIDTH=2147155,AVERAGE-
BANDWIDTH=1724636,CODECS="avc1.640028,mp4a.40.2",RESOLUTION=960x540,
AUDIO="audio_aac",SUBTITLES="cbsi_webvtt"
CBS_NCIS_366_AA_6CH_30M_1732145_1500/stream.m3u8
#EXT-X-STREAM-INF:PROGRAM-ID=0,BANDWIDTH=4069099,AVERAGE-
BANDWIDTH=3248348,CODECS="avc1.640028,mp4a.40.2",RESOLUTION=1280x720,
AUDIO="audio_aac",SUBTITLES="cbsi_webvtt"
CBS_NCIS_366_AA_6CH_30M_1732145_3000/stream.m3u8
..............
#EXT-X-STREAM-INF:PROGRAM-ID=0,BANDWIDTH=1238921,AVERAGE-
BANDWIDTH=1022110,CODECS="avc1.640028,ec-
3",RESOLUTION=768x432,AUDIO="audio_ec3",SUBTITLES="cbsi_webvtt"
CBS_NCIS_366_AA_6CH_30M_1732145_750/stream.m3u8
```

-continued

```
#EXT-X-I-FRAME-STREAM-INF:PROGRAM-
ID=0,BANDWIDTH=501083,AVERAGE-
BANDWIDTH=225982,CODECS="avc1.640028",RESOLUTION=960x540,URI="CBS_
NCIS_366_AA_6CH_30M_1732145_1500/stream_iframe.m3u8"
...........
#EXT-X-I-FRAME-STREAM-INF:PROGRAM-
ID=0,BANDWIDTH=289231,AVERAGE-
BANDWIDTH=130605,CODECS="avc1.640028",RESOLUTION=768x432,URI="CBS_
NCIS_366_AA_6CH_30M_1732145_750/stream_iframe.m3u8"
```

Note that the manifest adaptation sets can be recorded for cases such as having multi language streams or multi codec streams which specify ordering for languages and codecs respectively. Further, other formatting can be accomplished in a known manner to comply with all specifications.

The disclosed implementations result in an optimal runtime job where there is no need to re-encode and package all streams again because the implementation only encode the new streams that were uploaded and a delta manifest is used to generate the final manifest with respective tracks added or updated in the manifest. While the examples relate to audio and subtitle tracks specifically, any type of track can be added or changed using the disclosed implementations.

Returning to FIG. 1, server(s) 102, client computing platform(s) 104, and/or external resources 118 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 118 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 118, and/or provide other functionality attributed herein to client computing platform(s) 104. By way of non-limiting example, the given client computing platform 104 may include one or more of a desktop computer, a laptop computer, a handheld computer, a tablet computing platform, a Smartphone, a gaming console, and/or other computing platforms.

External resources 118 may include sources of information outside of system 100, external entities participating with system 100, and/or other resources. In some implementations, some or all of the functionality attributed herein to external resources 118 may be provided by resources included in system 100.

Server(s) 102 may include electronic storage 120, one or more processors 122, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 120 may comprise non-transitory storage media that electronically stores information. The electronic storage media of electronic storage 120 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 120 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 120 may include one or more virtual storage resources (e.g., cloud storage, a virtual private network, and/or other virtual storage resources). Electronic storage 120 may store software algorithms, information determined by processor(s) 122, information received from server(s) 102, information received from client computing platform(s) 104, and/or other information that enables server(s) 102 to function as described herein.

Processor(s) 122 may be configured to provide information processing capabilities in server(s) 102. As such, processor(s) 122 may include one or more of a digital processor, an analog processor, a digital circuit designed to process information, an analog circuit designed to process information, a state machine, and/or other mechanisms for electronically processing information. Although processor(s) 122 is shown in FIG. 1 as a single entity, this is for illustrative purposes only. In some implementations, processor(s) 122 may include a plurality of processing units. These processing units may be physically located within the same device, or processor(s) 122 may represent processing functionality of a plurality of devices operating in coordination. Processor(s) 122 may be configured to execute modules 108, 110, 112, 114, and/or 116, and/or other modules. Processor(s) 122 may be configured to execute modules 108, 110, 112, 114, and/or 116, and/or other modules by software; hardware; firmware; some combination of software, hardware, and/or firmware; and/or other mechanisms for configuring processing capabilities on processor(s) 122. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 108, 110, 112, 114, and/or 116 are illustrated in FIG. 1 as being implemented within a single processing unit, in implementations in which processor(s) 122 includes multiple processing units, one or more of modules 108, 110, 112, 114, and/or 116 may be implemented remotely from the other modules. The description of the functionality provided by the different modules 108, 110, 112, 114, and/or 116 described below is for illustrative purposes, and is not intended to be limiting, as any of modules 108, 110, 112, 114, and/or 116 may provide more or less functionality than is described. For example, one or more of modules 108, 110, 112, 114, and/or 116 may be eliminated, and some or all of its functionality may be provided by other ones of modules 108, 110, 112, 114, and/or 116. As another example, processor(s) 122 may be configured to execute one or more additional modules that may perform some or all of the functionality attributed below to one of modules 108, 110, 112, 114, and/or 116.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for updating metadata in a static manifest corresponding to a media stream package, the media stream package containing a sequence of media segments of a recorded media stream, the static manifest containing information describing the media segments in accordance with a predetermined specification and including a location of the corresponding video data files, the system comprising:

one or more hardware processors configured by machine-readable instructions to:

receive an original manifest corresponding to the media stream and a revised manifest corresponding to an updated version of the media stream, the revised manifest including metadata related to a new track to be added to the media stream to create the updated version of the media stream, wherein the new track is one of an audio track or a subtitle track;

determine a unique identifier of the track of the media stream based on a combination of metadata in the original manifest;

determine a unique identifier of a corresponding track of the updated version of the media stream based on a combination of metadata in the revised manifest;

determine new metadata in the revised manifest that is not included in the existing manifest based on the unique identifiers;

generate a delta manifest of the new metadata by comparing the original manifest and the revised manifest; and insert the new metadata into the corresponding portions of original manifest and storing the resulting data structure to a data store associated with stored media objects for the updated to thereby generate a final manifest to be used for the media stream package.

2. The system of claim 1, wherein the unique identifiers are generated based properties of a corresponding track.

3. The system of claim 2, wherein the unique identifiers are generated in a manner that corresponds to the predetermined specification.

4. A method for updating metadata in a static manifest corresponding to a media stream package, the media stream package containing a sequence of media segments of a recorded media stream, the static manifest containing information describing the media segments in accordance with a predetermined specification and including a location of the corresponding video data files, the method comprising:

receiving an original manifest corresponding to the media stream and a revised manifest corresponding to an updated version of the media stream, the revised manifest including metadata related to a new track to be added to the media stream to create the updated version of the media stream, wherein the new track is one of an audio track or a subtitle track;

determining a unique identifier of the track of the media stream based on a combination of metadata in the original manifest;

determining a unique identifier of a corresponding track of the updated version of the media stream based on a combination of metadata in the revised manifest;

determining new metadata in the revised manifest that is not included in the existing manifest based on the unique identifiers;

generating a delta manifest of the new metadata by comparing the original manifest and the revised manifest;

inserting the new metadata into the corresponding portions of original manifest and storing the resulting data structure to a data store associated with stored media objects for the updated to thereby generate a final manifest to be used for the media stream package.

5. The method of claim 4, wherein the unique identifiers are generated based properties of a corresponding track.

6. The method of claim 5, wherein the unique identifiers are generated in a manner that corresponds to the predetermined specification.

7. A non-transient computer-readable storage medium having instructions embodied thereon, the instructions being executable by one or more processors to perform a method for updating metadata in a static manifest corresponding to a media stream package, the media stream package containing a sequence of media segments of a recorded media stream, the static manifest containing information describing the media segments in accordance with a predetermined specification and including a location of the corresponding video data files, the method comprising:

receiving an original manifest corresponding to the media stream and a revised manifest corresponding to an updated version of the media stream, the revised manifest including metadata related to a new track to be added to the media stream to create the updated version of the media stream, wherein the new track is one of an audio track or a subtitle track;

determining a unique identifier of the track of the media stream based on a combination of metadata in the original manifest;

determining a unique identifier of a corresponding track of the updated version of the media stream based on a combination of metadata in the revised manifest;

determining new metadata in the revised manifest that is not included in the existing manifest based on the unique identifiers;

generating a delta manifest of the new metadata by comparing the original manifest and the revised manifest;

inserting the new metadata into the corresponding portions of original manifest and storing the resulting data structure to a data store associated with stored media objects for the updated to thereby generate a final manifest to be used for the media stream package.

8. The computer-readable storage medium of claim 7, wherein the unique identifiers are generated based properties of a corresponding track.

9. The computer-readable storage medium of claim 8, wherein the unique identifiers are generated in a manner that corresponds to the predetermined.

* * * * *